(No Model.)
J. FOURNIER, Jr.
FOLDING CABINET BED.
No. 254,632. Patented Mar. 7, 1882.
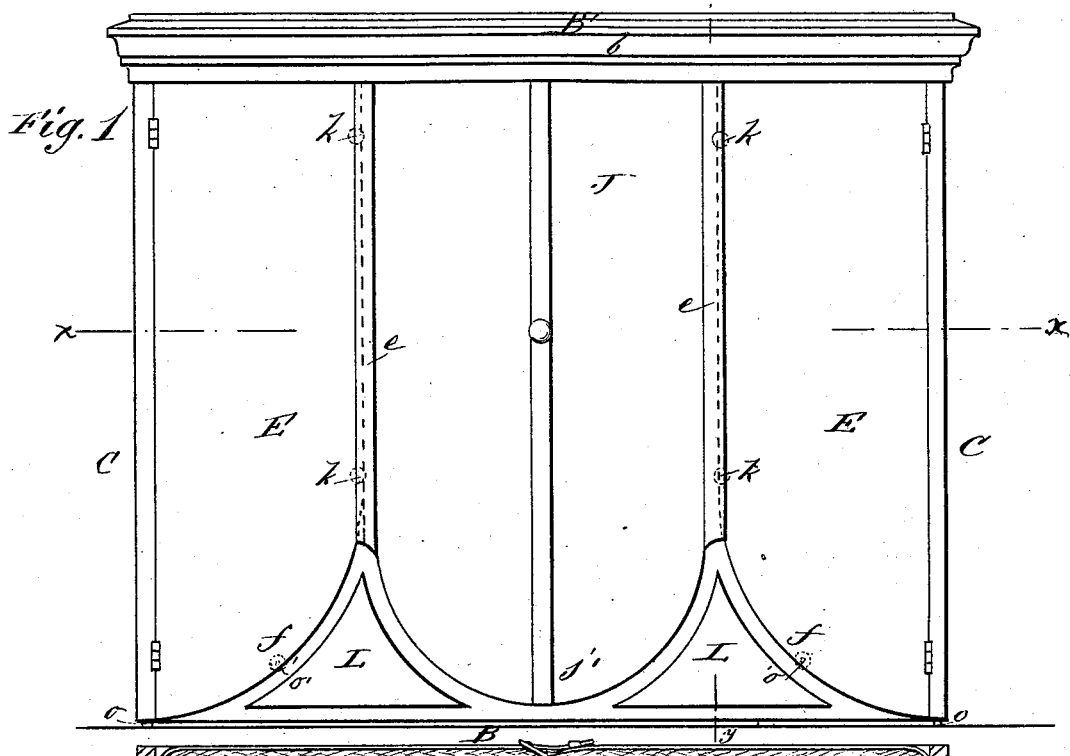
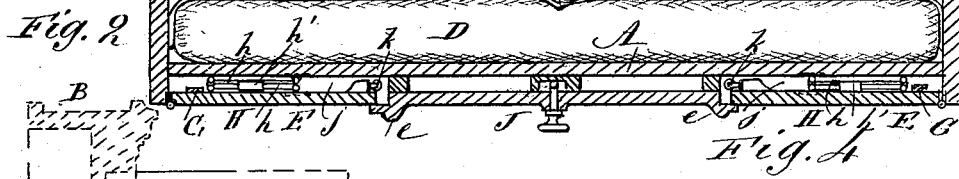
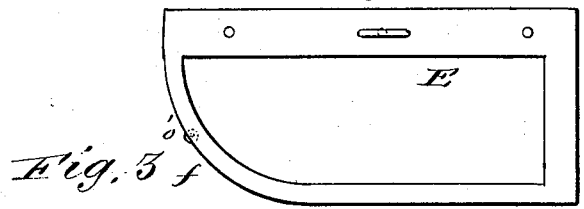
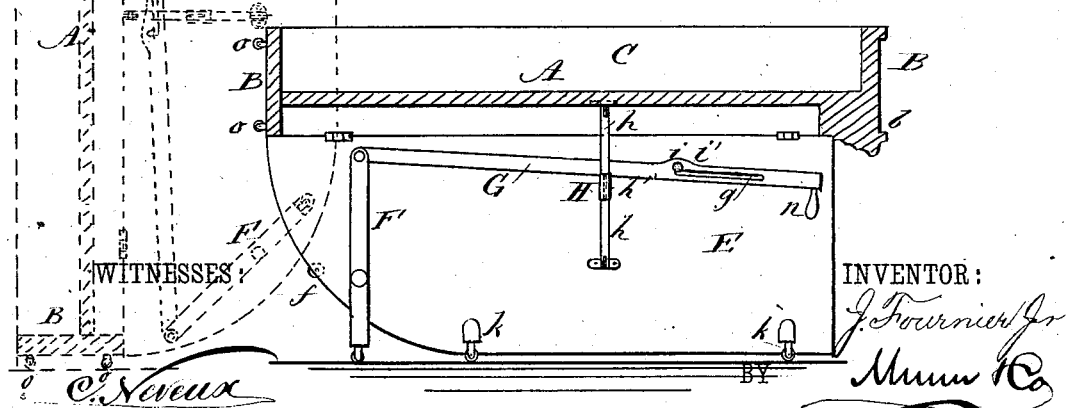
WITNESSES:
C. Neveux
C. Sedgwick
INVENTOR:
J. Fournier Jr
BY Munn & Co
ATTORNEYS.

UNITED STATES PATENT OFFICE.

JOSEPH FOURNIER, JR., OF NEW YORK, N. Y.

FOLDING CABINET-BED.

SPECIFICATION forming part of Letters Patent No. 254,632, dated March 7, 1882.

Application filed January 23, 1882. (No model.)

*To all whom it may concern:*

Be it known that I, JOSEPH FOURNIER, Jr., of the city, county, and State of New York, have invented a new and useful Improvement in Folding Cabinet-Beds, of which the following is a full, clear, and exact description.

My improved bedstead is adapted to be raised or tipped upon one of its edges, so as to stand in a vertical position against the wall when not in use. When in a horizontal position for use the bedstead is supported upon leaves hinged to the ends of the bedstead, and these leaves are adapted to be closed or folded in, like doors, against the bottom of the bedstead, so as to give the bedstead the appearance of a wardrobe or cabinet when tipped upon its edge. The leaves are rounded off at one end to form rockers, which facilitate the raising and lowering of the bedstead to its different positions. Pivoted legs are provided for preventing the bed from rocking when in position for use, and novel means are provided for locking the leaves in folded position, and for bracing them in unfolded position for supporting the bed.

The invention consists of a bedstead adapted to be tipped upon one side or edge and supported in horizontal position upon hinged leaves; of rounding the ends of the leaves; of the means for locking the leaves in folded position, and of the means for bracing the leaves for supporting the bedstead, and also of the construction, arrangement, and combination of parts, all as hereinafter more fully described.
Reference is to be had to the accompanying drawings, forming a part of this specification, in which similar letters of reference indicate corresponding parts in all the figures.

Figure 1 is an elevation of my improved bedstead as it appears when tipped upon its edge and the leaves folded. Fig. 2 is a sectional plan view of the same, taken on the line $x\,x$ of Fig. 1. Fig. 3 is a sectional elevation taken on the line $y\,y$ of Fig. 1, the bedstead being shown in horizontal position in full lines and in vertical position in dotted lines; and Fig. 4 is a plan view, showing a modification of the leaves or rockers.

A represents the bed-bottom, B B the side rails, and C C end rails. These parts constitute the receptacle for the mattress D, as shown in Fig. 2.

E E represent the leaves, which are hinged to the lower edges of the end rails. The lower ends of these leaves are rounded off, as shown at $f\,f$, so that the bed may be easily tipped or raised from the position shown in Fig. 3 to that shown in Fig. 1. To prevent the bed from rocking when held in a horizontal position upon the leaves E E, I provide the leaves upon the inside with the legs F F, which are pivoted to the leaves near their curved ends, and are so arranged that when brought to a vertical position upon their pivots the lower ends of the legs (or the casters thereof) will be on a level with the main or straight bottom of the leaves, as clearly indicated in Fig. 3, so as to rest upon the floor, and thus support the bed; but when moved out of vertical line the lower ends of the legs will come within the lower edges of the leaves and will not interfere with the easy tipping or raising up of the bed to vertical position. These legs are moved upon their pivots from the front of the bed by means of the rods G G, which are pivoted to the upper ends of the legs F F, and which are formed with the slots $g\,g$, through which the pins $i\,i$ pass for retaining the rods against the sides of the leaves. The slots $g\,g$ are formed with the detents $i'\,i'$ at the rear ends of the slots for locking the rods and legs by the engagement of the rods with the pins $i\,i$, as will be clearly understood from Fig. 3.

The leaves E E are braced in vertical position for supporting the bed by means of the braces H H, which are formed of the parts $h\,h$, which are hinged to each other and to the bottom of the bed, and the inside of the leaves is clearly shown in Fig. 3. These hinges are adapted to fold up, as shown in Fig. 2, so as to be inclosed in the space $j$ between the bottom of the bed and the leaves, when the leaves are folded in or against the bottom of the bed, when in vertical position. When the leaves are swung out for supporting the bed in horizontal position the braces are kept from folding by means of the sleeves $h'$, which are to be moved upon the rods over the central joints of the braces, as shown in Fig. 3, and thus cause the braces to brace and hold the leaves. The lower edges of the leaves are provided with the casters k k, as shown in the drawings. When the bed is raised upon its edge and the leaves are folded in upon the bottom of the bed, as shown in Fig. 1, the leaves are held in closed position by the flanges or moldings e e of the sliding panel, J, which are of sufficient width to reach over the casters k k, and stand in front of the inner edges of both of the leaves, when the panel J is held in a central position, as shown in Figs. 1 and 2, between the leaves. But these flanges are of such a width, and the leaves and panel are so arranged that when the panel is shoved to one side, so that the edge of the panel comes against the edge of one of the leaves, the other leaf will be released, so that it may be opened, and then upon shoving the panel to the opposite side the other door will be released from the flange or molding, and thus made free to be opened. The lower end of the panel J is rounded off, as shown at j', and the spaces between the rounded ends of the leaves and the rounded end of the panel J are filled by the fixed triangular panels L L, and the side bar, B', of the bed is faced with the molding b, as shown in Figs. 1 and 2. By this means, when the bed is tipped upon its edge and the leaves are folded and locked the bed will present the appearance of a case or cabinet in the room, and may be moved back upon the casters o o against the wall, so as to occupy small space in the room, and serve as an ornamental piece of furniture when not in use.

In order to lower the bedstead to horizontal position for use, it is only necessary to open the leaves, as above described, shove the sleeves h' h' over the joints of the braces H H, and bring the bedstead forward upon the leaves, the curves of the leaves permitting the bedstead to be easily lowered upon the edges of the leaves. The legs F F are then to be brought to vertical position by drawing the rods G G forward, which can be conveniently done by means of the handles n n of the rods, which stand near the straight or outer ends of the leaves, as shown at Fig. 3.

In order to raise the bed to vertical position, the legs F F are to be moved to the position shown in dotted lines in Fig. 3 by forcing the rods G G backward, and this causes the bed to be practically counterbalanced upon the leaves or rockers, so that it may be raised or placed upon its edge with comparatively no exertion. The sleeves h' are then to be moved upon the rods of the braces from over the central joints of the braces, which permits the leaves to be folded in upon the bottom of the bedstead, like doors, in which position they are to be locked by the sliding panel J, as above described.

Instead of constructing the bedstead to have the leaves permanently hinged to it, the same may be so constructed as to be adapted to be used with detached leaves—such as shown in Fig. 4—the leaves being adapted to be attached to the end boards of the bed by any suitable means, and adapted to be easily detached and to be placed behind the bed when raised to vertical position.

Though I have shown in the drawings the leaves E E hinged to the end pieces of the bedstead, I wish it understood that I do not confine myself to such construction, as the leaves may be hinged to the side pieces or rails of the bed, adapting the bed to be placed upon one end when not in use, instead of upon one side, and in case of children's cribs and small beds this plan will be adopted.

On the curved edges of the leaves are placed the casters o' o', which project slightly from the edges of the leaves and serve to cause the bedstead, when lowered to horizontal position, to move toward the wall at the back of the bed, and also to move away from the wall while being raised to vertical position. This movement is particularly necessary when the bedstead is to be used in small narrow rooms.

Having thus described my invention, I claim as new and desire to secure by Letters Patent—

1. In a cabinet-bedstead, the leaves E E, hinged to the end rails, C, and adapted to support the bedstead in horizontal position, and to be folded in against the bottom of the bedstead when the same is in vertical position, substantially as described.

2. In a cabinet-bedstead, the leaves E E, hinged to the end rails, C, and having lower rounded ends, f f, whereby the bedstead may be easily raised and lowered to its different positions, substantially as set forth.

3. The hinged leaves E E, in combination with the sliding panel J, as and for the purposes set forth.

4. The hinged leaves E E, in combination with the jointed braces H H and the sliding sleeves h', substantially as described.

5. In combination with the hinged and rounded leaves E E, the pivoted legs F F, slotted rods G G, and pins i, substantially as described.

6. The body of the bedstead, formed with the molding b and the panels L L, in combination with the hinged leaves E E and sliding panel J, the leaves being rounded at the lower inner corners, substantially as and for the purposes set forth.

JOSEPH FOURNIER, JR.

Witnesses:
H. A. WEST,
C. SEDGWICK.